United States Patent Office 3,764,356
Patented Oct. 9, 1973

3,764,356
HYDRATED ALKALI METAL SILICATE GLASS
PARTICLES WITH SEQUESTERING AGENTS
Robert H. Sams, Aldan, Pa., assignor to Philadelphia
Quartz Company, Philadelphia, Pa.
No Drawing. Filed Jan. 25, 1971, Ser. No. 109,577
Int. Cl. C09d 1/04; C11d 3/08
U.S. Cl. 106—74                              12 Claims

ABSTRACT OF THE DISCLOSURE

Alakli metal silicate glass particles are hydrated with solutions of organic sequestering agents to produce a hydrated, readily soluble composite.

INTRODUCTION

The preparation of alkali metal silicate glasses has been known and practiced for many years but hydrated readily soluble alkali metal silicate glasses have not been available as commercial products. The problems associated with such glasses such as caking and incomplete or difficult solubility, are related to inhomogeneous distribution of water throughout the glass. A method has been found to hydrate alkali metal silicate glass to a homogeneous state and produce a composite of alkali metal silicate glass and organic sequestering agent. The method consists of using a solution of a sequestering agent such as the sodium salt of ethylenediaminetetraacetic acid ($Na_4EDTA$) or sodium glucoheptonate to hydrate a finely divided alkali metal silicate glass. The finely divided glass is moistened with the amount of sequestering agent solution to provide the desired ratio of sequestering agent solids to silicate solids and water content. The moist mass is then heated to increase the hydration rate of the glass and to drive off any excess water. Solid sequestering agents can be mixed with the glass and then water is used to hydrate the glass and the sequestering agent, if the agent can be hydrated. It is also possible to use an alkali metal silicate solution with the sequestering agent dissolved therein to provide the moisture needed for hydration. When the hydration of the glass is complete, the mass becomes rigid. The cake is easily granulated to form a readily soluble, hydrated particulate composite. The product is useful in any application in which a sequestering agent and silicate are needed, particularly in detergents and cleaning compounds.

THE INVENTION

The finely divided alkali metal silicate glass can be produced by any method such as fusion of an alkali metal carbonate with a source of silica; the $SiO_2/M_2O$ mole ratio of the glass can be 1.5:1 to 4.0:1 where M stands for an alkali metal or a combination of alkali metals. The particle size of the glass is important and it should be less than 100 mesh and preferably less than 200 mesh. Silicate glass that has been ground in ball mills and the like is useful for this invention but other methods of subdividing glasses are more suitable for this invention. Such methods include thermal stressing of thin glass films as described in a copending patent application Ser. No. 153,806 and by chopping fine fibers of silicate glass or jet atomization of molten glass to form beads as described in a copending patent application Ser. No. 129,107. Commonly, sodium silicate glasses are used in this invention but potassium silicate glasses can be used. It has also been found that sodium-potassium double silicate glasses are particularly useful.

The sequestering agent is considered to be any chemical capable of reducing the activity of metal ions in solution and maintaining the ions in solution. The most important of such metal ions are $Ca^{++}$ and $Mg^{++}$ which precipitate soap and silicates, and decrease the efficiency of surfactants and in general are responsible for the reactions of hard water. Many chemicals reduce the activity of metal ions in solution but do not maintain the ions in solution while the agents employed in this invention achieve both functions. Such agents include the following organic acids and their salts, especially sodium and potassium salts: nitrilotriacetic acid (NTA), ethylenediaminetetraacetic acid (EDTA), diethylenetriaminepentaacetic acid (DPTA) and citric acid. Polyacids, polyacid hydroxides and their salts are useful; examples of these materials are ascorbic acid, glycolic acid and lactic acid. Other useful materials are diethanol glycene, sodium gluconate, sodium glucoheptonate and sodium boroglucoheptonate. Of course, the hydrates of these organic sequestering agents are useful. Other useful materials include polyelectrolytes such as polyacrylamine, modified starches and polyols such as Pluronic electrolytes sold by Wyandotte Chemical Company.

The sequestering agent solution can contain from 5 to 75% solids and can be sprayed onto the glass particles or it can be mixed with the glass particles in a muller or crutcher. The temperature during this mixing can be above 70° C. to hasten the moisture equilibration. The sequestering agent solids can also be mixed with the silicate glass particles in a muller or crutcher and then sprayed or mixed with water. Again the temperature during the addition of the water should be above 70° C.

The hydration of alkali metal silicate glass is greatly facilitated by inclusion of sequestering agents in the process. The sequestering agents reduce the activity of metal ions such as those of calcium, magnesium and iron which would usually inhibit effective hydration of the glass by formation of insoluble compounds on the surface of the glass. The ratio of sequestering agent solids to the alkali metal silicate can be from 0.10:1 to 3.4:1.

After the addition of the water or solution the moist mass is placed in a container which may be lined with a hydrophobic plastic. The container can be closed if no water is to be evaporated or it can be open if water is to be evaporated. The container is then heated; the temperature can vary from 70° C. to 190° C. The open container cannot be heated above 100° C., and is generally not heated above 95° C. to prevent overdrying of the glass. The closed container is heated between 95 and 190° C. Of course, the container can be open for the first part of the heating period to evaporate water and may be closed for the final heating period. The heating period can vary greatly but is usually from 0.5 to 10 hours.

As equilibrium is attained the mass becomes rigid. After cooling the cake is removed from the container and easily granulated. The product is an essentially granular product which does not cake or exhibit any other evidence that the water contained was not equilibrated fully. The moisture content of the product can be 5 to 25% and the products are very fast dissolving when compared with anhydrous or glass that is hydrated by other methods. The composite is almost completely soluble with the insoluble being about 0.3% or less when 5 g. of the material is dissolved in 95 g. of water at 75° C. for 5 minutes. The bulk density of the products can vary from 40 to 70 lbs./cu. ft.

These products can be used for any applications in which both sequestering agents and silicates are needed. For example, the product could be used to treat water mains to prevent metal corrosion in hard water conditions. The sequestering agents complex the metal ions and prevent the formation and precipitation of insoluble silicates. In this way the silicate ion remains available for coating the water main and preventing corrosion. The product is also extremely useful in preparing detergent mixtures and other cleaning compounds. It is possible to partially or completely replace the phosphates in these detergents by these novel hydrated silicate/organic sequestering agent combination products.

EXAMPLES

A further understanding of the invention can be obtained from the following illustrative examples which are not to be considered restrictive.

Example 1

A sodium silicate glass with a mole ratio of 2.4 $SiO_2/Na_2O$ and a particle size of less than 200 mesh was hydrated with a solution of sodium nitrilotriacetic acid (SNTA). The glass, 500 p.b.w., was placed in a muller and 150 p.b.w. of a 50% aqueous solution of SNTA were mixed with the glass at a temperature of 70° C. After complete mixing the mass was placed in a closed, lined container and heated to 103° C. for 2.5 hours. After recooling the resulting cake was granulated by jaw crushing to a particle size of less than 100 mesh. The product was free-flowing, non-caking and the sequestering agent did not separate from the glass. The moisture content of the composite was 11.5% and it dissolved readily in water with only 0.28% insoluble when 5 g. of the composite was dissolved in 95 g. of water at 75° C. for 10 minutes. The bulk density of the product was 60 lbs./cu. ft. The SNTA content of the composite was 11.5%.

Example 2

A potassium silicate glass with a mole ratio of 3.2 $SiO_2/K_2O$ and a particle size of less than 200 mesh was subjected to the process of Example 1 except that the material was heated to 112° C. for 2.25 hours. The resulting cake was granulated by jaw crushing to a particle of less than 100 mesh. The product was free-flowing, non-caking and the sequestering agent did not separate from the glass. The moisture content of the composite was 11.5% and it dissolved readily in water with only 0.23% insoluble when 5 g. of the composite was dissolved in 95 g. of water at 75° C. for 5 minutes. The bulk density of the product was 57 lbs./cu. ft. The SNTA content of the composite was 11.5%.

Example 3

A sodium-potassium double silicate glass with a mole ratio of 2.4 $SiO_2/Na_2O+K_2O$, a ratio of $Na_2O/K_2O$ of 1.0 and a particle size of less than 200 mesh was subjected to the process of Example 1 except that 300 pbw. of a 50% solution of the sodium salt of ethylenediaminetetraacetic acid was used instead of the SNTA. The material was heated to 122° C. for 3.5 hours. The resulting cake was granulated by jaw crushing to a particle size of less than 100 mesh. The product was free-flowing, non-caking and the sequestering agent did not separate from the glass. The moisture content of the composite was 22.9% and it dissolved readily in water with only 0.31% undissolved residue when 5 g. of the composite was in 95 g. of water at 75° C. for 7 minutes. The $Na_4EDTA$ content of the composite was 23.0%.

Example 4

A sodium silicate glass with a mole ratio of 1.6 $SiO_2/Na_2O$ and a particle size of less than 150 mesh was hydrated with a solution of sodium glucoheptonate. The glass, 500 pbw. was placed in a muller and 300 pbw. of a 50% solution of the sodium glucoheptonate was mixed with the glass at 70° C. After complete mixing the moist mass was poured into a lined container and heated at 95° C. for 1 hour with the container open, about 50 pbw. of water was evaporated in this time. Then the container was closed and the temperature raised to 110° C. for 1.5 hours. After recooling the resulting cake was granulated by jaw crushing to a particle size of 10 to 65 mesh. The product was free-flowing, non-caking and the sequestering agent did not separate from the glass. The moisture content of the composite was 13.3% and it dissolved readily in water with only 0.21% insoluble when 5 g. of the composite was dissolved in 95 g. of water at 75° C. for 10 minutes. The bulk density of the product was 50 lbs./cu. ft. The sodium glucoheptonate content was 20.0%.

Example 5

A sodium silicate glass with a mole ratio of 2.0 $SiO_2/Na_2O$ and a particle size of less than 200 mesh was mixed with sodium glucoheptonate dihydrate. The glass, 500 pbw. and the sodium glucoheptonate, 575 pbw., were mixed in a muller then 200 pbw. of water were added. After mixing thoroughly the mushy mass was placed in a lined, closed container and heated for 2.5 hours at 125° C. After recooling the resulting cake was granulated by jaw crushing to a particle size of 10 to 65 mesh. The product was free-flowing, non-caking and the sequestering agent did not separate from the glass. The moisture content was 21.5% and the product dissolved readily in water with only 0.25% insoluble when 5 g. of the composite was dissolved in 95 g. of water at 75° C. for 10 minutes. The bulk density of the product was 45 lbs./cu. ft. The sodium glucoheptonate content was 39.2%.

Example 6

A phosphate-free laundry detergent was prepared using the composite of silicate and sodium glucoheptonate prepared as described in Example 5. The composition of this detergent was:

| | Pbw. |
|---|---|
| Nacconol 40 DB (anionic surfactant; Allied Chemical Corp.) | 7.5 |
| Triton N-101 (nonionic surfactant; Rohm & Haas Corp.) | 7.5 |
| Composite of Example 5 (39.2% silicate solids, 39.2% sodium glucoheptonate, 21.5% $H_2O$) | 68.0 |
| Na CMC (sodium carboxymethyl cellulose) | 1.0 |
| Blancophor RG (optical brightener; GAF Corp.) | 0.1 |
| $Na_2CO_3$ | 13.0 |
| $Na_2SO_4$ | 3.0 |

This mixture was dry blended with no difficulty, dissolved in a normal washing solution and was an effective laundering agent.

Example 7

A sodium silicate glass with a mole ratio of 3.2 $SiO_2/Na_2O$ and a particle size less than 200 mesh was mixed with polyacrylamide. The glass, 500 pbw. and the polyelectrolyte, 100 pbw., were mixed thoroughly in a muller then 200 pbw. of water were added. The mixing was continued at 75° C. until the mix was uniform. Then the mushy mass was placed in a lined closed container and heated for 3 hours at 127° C. After recooling the cake was granulated by jaw crushing to a particle size of 10 to 65 mesh. The product was free-flowing and the sequestering agent did not separate from the glass. The moisture content was 25% and the product dissolved readily in water with 0.32% undissolved when 5 g. of the composite was dissolved in 95 g. of water at 75° C. for 10 minutes. The bulk density of the product was 67 lbs./cu. ft. The polyelectrolyte content was 12.5%.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. A mass of readily soluble particles, each of which consists essentially of a hydrated alkali metal silicate glass and an anhydrous organic sequestering agent, wherein:
   (a) the ratio of sequestering agent solids to alkali metal silicate solids is 0.10:1 to 3.4:1;
   (b) the $SiO_2/M_2O$ mole ratio of the alkali metal silicate glass is 1.5:1 to 4:1;
   (c) the moisture content is 5 to 25%; and
   (d) the bulk density is 40 to 70 lbs./cu. ft.

2. The particle of claim 1 in which the sequestering agent is selected from a group consisting of organic amino acids, sodium salts of organic amino acids, potassium salts of organic amino acids, organic hydroxy acids, sodium salts of organic hydroxy acids, potassium salts of organic hydroxy acids, organic polyhydroxy acids, sodium salts of organic polyhydroxy acids and potassium salts of organic polyhydroxy acids.

3. The particle of claim 1 in which the sequestering agent is from a group consisting of nitrilotriacetic acid, sodium nitrilotriacetic acid, ethylenediaminetetraacetic acid, sodium ethylenediaminetetraacetic acid, sodium gluconate, sodium glucoheptonate and sodium boroglucoheptonate.

4. The particle of claim 1 in which the sequestering agent is a polyelectrolyte.

5. The particle of claim 1 in which the alkali metal silicate glass is selected from a group consisting of sodium silicate glass, potassium silicate glass and sodium-potassium silicate glass.

6. The process for preparing the product of claim 1 which consists essentially of subjecting a mixture of an alkali metal silicate glass, an organic sequestering agent and water to a temperature between 70 and 195° C. for 0.5 to 10 hours, recovering a cake, and then cooling and crushing the resulting cake.

7. The process of claim 6 in which the organic sequestering agent is added as a solution.

8. The process of claim 6 in which the water is added by means of an alkali metal silicate solution.

9. The process of claim 6 in which the alkali metal silicate glass, organic sequestering agent and water mixture is heated in a closed container.

10. The process of claim 6 in which the alkali metal silicate, organic sequestering agent and water mixture is heated in an open container.

11. The process of claim 6 in which the alkali metal silicate, organic sequestering agent and water mixture is heated in an open container which is closed when the water content is between 5 and 25%.

12. The process of claim 6 in which the organic sequestering agent is added as a solution with alkali metal silicate.

References Cited
UNITED STATES PATENTS

| | | | |
|---|---|---|---|
| 2,741,599 | 4/1956 | McDonald et al. | 252—527 |
| 3,151,084 | 9/1964 | Schiltz et al. | 252—527 |
| 3,356,613 | 12/1967 | Gedge | 252—527 |
| 3,615,779 | 10/1971 | Von Freyhold | 106—74 |

JAMES E. POER, Primary Examiner

U.S. Cl. X.R.

252—135, 523, 525, 527